Sept. 17, 1963  C. T. BREITENSTEIN  3,103,873
HIGH-SPEED BEVERAGE BREWER
Filed Dec. 31, 1959  5 Sheets-Sheet 1

INVENTOR.
CHARLES T. BREITENSTEIN
BY
HIS ATTORNEY.

Sept. 17, 1963

C. T. BREITENSTEIN 3,103,873

HIGH-SPEED BEVERAGE BREWER

Filed Dec. 31, 1959

INVENTOR.
CHARLES T. BREITENSTEIN
BY
HIS ATTORNEY.

Sept. 17, 1963    C. T. BREITENSTEIN    3,103,873
HIGH-SPEED BEVERAGE BREWER Filed Dec. 31, 1959    5 Sheets-Sheet 3

INVENTOR.
CHARLES T. BREITENSTEIN
BY
HIS ATTORNEY.

Sept. 17, 1963 C. T. BREITENSTEIN 3,103,873
HIGH-SPEED BEVERAGE BREWER
Filed Dec. 31, 1959 5 Sheets-Sheet 4

INVENTOR.
CHARLES T. BREITENSTEIN
BY
HIS ATTORNEY.

United States Patent Office 3,103,873
Patented Sept. 17, 1963

3,103,873
HIGH-SPEED BEVERAGE BREWER
Charles T. Breitenstein, Chicago, Ill., assignor, by mesne assignments, to The Seeburg Corporation, Chicago, Ill., a corporation of Pennsylvania
Filed Dec. 31, 1959, Ser. No. 863,265
24 Claims. (Cl. 99—289)

The disclosed improvements have as their principal object the provision of a high-speed beverage brewing unit and associated control means of exceptionally compact, efficient, and dependable character, and having such a rapid delivery cycle that it can be used in both coin-operated dispensing machines and counter-service types of equipment for delivery of coffee brewed by the cup on demand.

More detailed objects and features of novelty of the apparatus include the progressive cycling of an extracting piston so that it functions during the beginning of each cycle as the bottom and loading closure for the brew chamber, and during the terminal part of its cycle as a forcible scavenging means; together with a simple brewer control and driving system in which the phasing of the driving stroke of the piston is contrived to permit loading the brew ingredients into the temporarily opened top of the brew cylinder during a very brief loading interval timed to follow a slight initial driving advance of the piston, which is halted momentarily immediately on its closing entry into the bottom of the cylinder, whereby to provide a stationary bottom and fixed volumetric capacity to receive a charge of water and ground coffee pending resumption of its advance into and through the extracting phase of its movement.

Additional features of the disclosure relate to the provision of improved filter means including a replaceable filter head carried as a part of a rocking top closure for the brew cylinder and adapted to be connected with a brew-dispensing line of predetermined volumetric capacity leading to the dispensing outlet, and through which the piston expels all but a small reflux volume of the brew equal to the predetermined volume of said line, the piston subsequently thereafter reversing action to retract the reflux volume and pull it back through the filter to cleanse the latter of residual grounds at the conclusion of each cycle.

Still other features relate to the provision of a simple driving and timing subassembly for moving the piston in controlled steps in its progressive cycling through loading, extracting, and return-scavenging phases, the latter involving an abrupt and high-speed return of the piston to its starting position together with means for bringing the fast-moving piston to a jarring stop shortly after it disengages and opens the bottom of the brew chamber, whereby the coffee grounds are violently dislodged therefrom.

Yet another feature resides in the formation of a one-piece chassis which mounts the brew cylinder, a standby heating means therefor, and the piston driving and timing subassembly in a unitary assemblage, with the said subassembly shielded in a compartment defined beneath the brew cylinder by an integral discharge apron pitched to guide away the dislodged grounds and brew residues.

A still further object is the provision of a piston comprising a Teflon piston shell backed by a rubber filler which minimizes the driving load, while permitting wobble with excellent wearing and sealing properties.

The foregoing and other aspects of novelty and utility are described in view of the annexed drawings in which.

Figure 1:
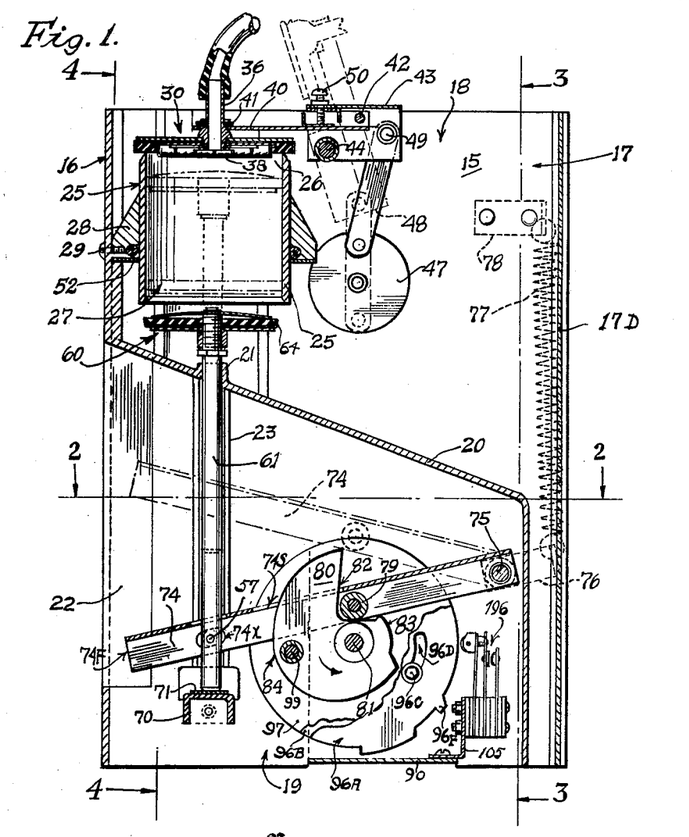
FIG. 1 is a vertical section through the brewing unit.
Figure 2:
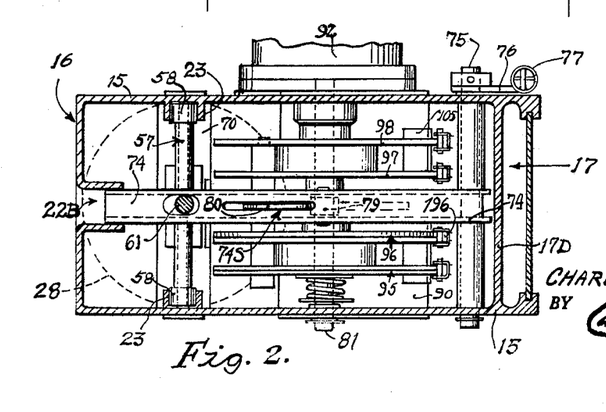
FIG. 2 is a horizontal section along lines 2—2 of FIG. 1.
Figure 3:
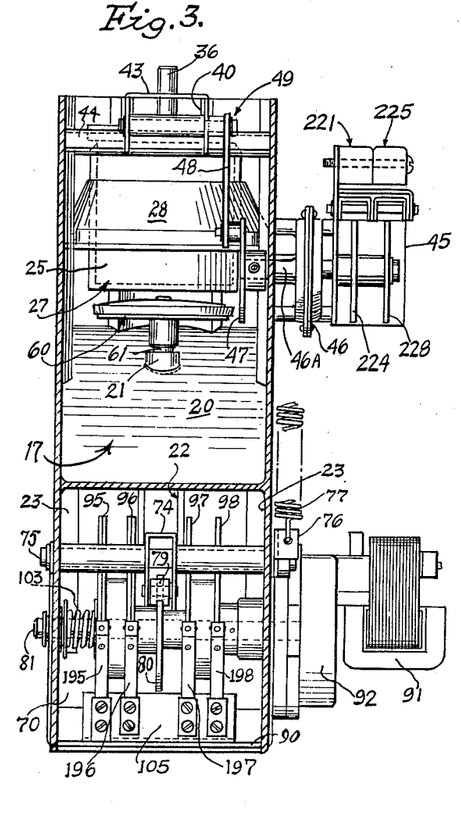
FIG. 3 is a lateral vertical section through the brewing unit looking into the front along lines 3—3 of FIG. 1, with parts shown in elevation.

Referring to FIGS. 1 and 2, the brewer unit comprises an upright chassis or body casting having opposite side walls 15, a back wall 16, an open front 17, and open top and bottom portions 18 and 19, the front being closable by a splash panel 17D.

At its mid-region the body casting has an integral apron 20 pitched toward the open front 17 and provided near its upper end with a pillar 21 bored to serve as a piston-rod guide and bearing. A first vertically-elongated guide track 22 is cast as a part of the back wall 16, the same being open-bottomed therethrough as at 22B (FIG. 2) for convenience in casting and machining, there being two additional guide tracks 23 cast on the inside of the side walls and constituting an aligned pair for purposes to appear.

Above the apron is a cylindrical brew chamber 25 having an open upper end 26 and open bottom 27, this member being carried in an annular seating block 28 secured to the casting by bolt means 29.

Figure 8:
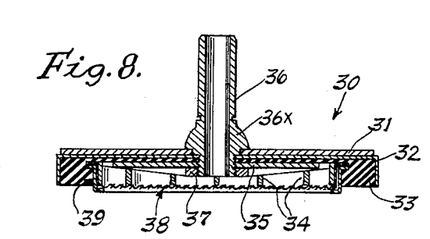
FIG. 8 is a sectional detail through the brew chamber lid.

A pivoted closure means for the top of the chamber is generally indicated at 30 in FIG. 1 and comprises, as viewed to larger scale in FIG. 8, a metal top disc 31, beneath which is an inverted gasket cup 32 having a suitably resilient annular gasket 33 seated therein and of a size to fit down upon and seal the upper margins of the beveled lip of the top of the cylinder. Carried beneath the gasket cup is a rigid filter grille 34, preferably an aluminum casting, which is seated against a large backing disc 35, this entire cover assembly being secured to a threaded discharge nipple 36 by a nut 37.

Stretched over the annular grille casting and around the rim thereof (FIG. 8) is a suitable filter cloth or diaphragm 38 retained thereon by a press-fitting rim hoop 39, which may be readily slipped off for easy change of filters.

The aforesaid cover or top closure assembly 30 is carried somewhat loosely at the end of a channel-shaped rocker arm 40 (FIGS. 3, 4, 6, and 7 variously) having a hole through which said nipple 36 projects freely, the nipple having for this purpose a rounded rocking shoulder 36X and being retained on the arm by means such as a spring C-washer 41 engaging suitable grooving in the neck of the nipple. The mobility of the cover assembly on its rocker arm affords a self-finding seating action on the cylinder.

At its end, opposite from the cover nipple, the rocker arm 40 is pivotally attached by a cross-pin 42 to a rockable carrier bracket 43 in the form of a reversely-opening channel bracket which in turn is pivotally supported on a longer pivot rod 44 seated in bores in the opposite side walls of the body casting.

The channel shaped carrier or rocker 43 is oscillated by an electrically-controlled means including a small electric motor 45 (FIGS. 3 and 6) mounted on the exterior of one of the side walls with a drive shaft 46A extending from an attached reduction gear unit 46 through the wall to engage a crank disc 47 (FIG. 1) to which is pivotally joined one end of a crank rod 48 pivotally connecting at 49 at its opposite end to the cover rocker or carrier 43.

Thus, operation of cover motor 45 rocks the carrier 43 about its main pivot 44 through crank means 47—48, and this movement of the carrier in turn moves the cover carrier arm 40 up and down with corresponding movement of the cover assembly 30 into and out of closing relation to the top of the brew chamber, owing to pivotal attachment of said cover arm 40 by pin 42 to the carrier bracket, and the provision of an adjustment screw 50 (FIGS. 1, 6, and 7) threaded through the bottom wall of the channel-shaped carrier to bear down upon the cover arm 40 at a point just above the main rocker rod 44. The adjustment screw permits a limited adjustment of the freedom of movement of the cover in seating down upon the rim of the chamber, which, along with the generally free or loose connection of the cover assembly to the rocker arm, permits the gasket to settle home for a positive seal with a more linear approach and without the rigid forcing thereof which the angular travel of the arm 40 would otherwise impose.

Means for standby heating of the brew chamber, to avoid dropping the temperature of the incoming hot brew water, includes an insulated electric heating coil 52 (FIG. 1) seated in an annular groove formed on the inside of the seating block 28 (FIG. 1) with appropriate electrical connections 53 thereto to maintain the chamber at a standby temperature of about 230° F., as will hereinafter appear, FIG. 10.

Figure 4:
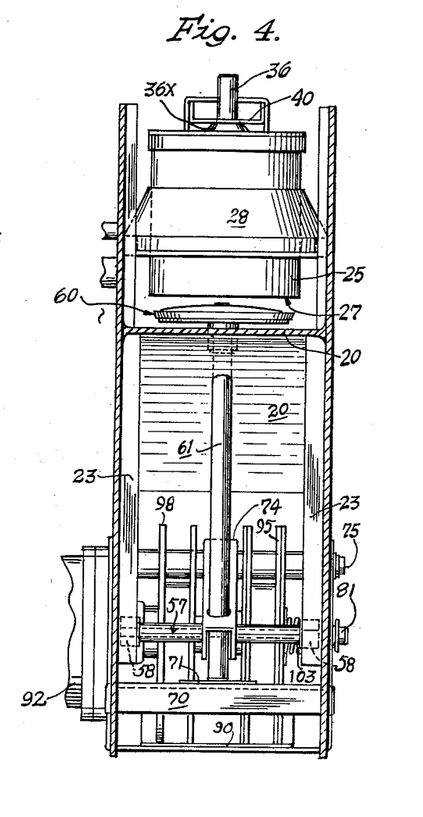
FIG. 4 is another lateral section like that of FIG. 3, but looking into the rear of the unit along lines 4—4 of FIG. 1.

The open bottom of the brew chamber is closeable by an especially contrived piston means, generally indicated at 60 (FIG. 1) and consisting of a long piston rod 61 reciprocably seated in the integral guide pillar 21 of the chassis body, and traversed near its bottom by a coupling pin 57 having endwise rollers 58 working in the chassis guide tracks 23, with the special piston assembly detailed hereafter carried on its upper end, FIGS. 2 and 4 also.

Figure 9:
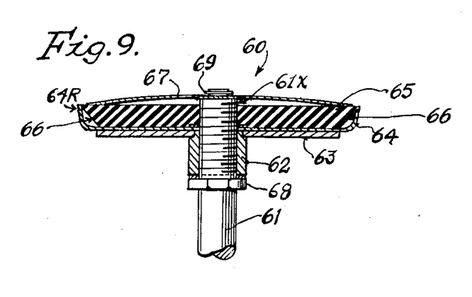
FIG. 9 is a partial sectional detail of the brew piston.

A very important feature of the brewer is the novel and particularly efficient piston means illustrated in FIG. 9 and comprising a shallow, thin-walled cup-shaped sealing skirt 64 made of Teflon or any equivalent material having similar bearing qualities and resistance to heat and chemicals, said skirt being seated upon a large metal backing disc 63 pressed onto the shouldered upper end of a metal collar 62 fitting over the threaded upper end 61X of the piston rod to seat against an adjusting nut 68 by means of which the entire piston assembly may be positioned selectively closer to, or away from, the upper end of the rod, as will more fully appear.

The novel piston structure is completed by provision of a resilient filler and spreader member 65 made in annular form from rubber, or a suitable synthetic substitute, to fit snugly on the rod and being considerably thicker and stiffer than the relatively thin-walled Teflon skirt. The filler member is further dimensioned to fit closely into the skirt and is provided with a sharply beveled outer edge 66 calculated to lie at the level of the rim 64R of the skirt and to press outwardly against the latter to fill out the same for good sealing and sliding fit with the wall of the brew chamber.

The out-spreading and filling action of the rubber filler member is augmented and stabilized by provision of a large spring header washer or spring spider plate 67 fitted down upon the filler piece and secured with the entire assembly atop the rod by means of a C-washer 69 or the like, which nevertheless permits a limited movement of the piston skirt and filler assembly, and the latter can yieldingly seek its sealing position in the cylinder and feel its way in and out of the cylinder in the lower phases of its cycle.

Loading losses on the piston due to factors such as friction, alignment, variable temperatures, presence of granular and liquid substance, and widely different rates of acceleration on entering and withdrawing from the cylinder, present serious problems in procuring consistent and efficient performance in achieving the exceptionally fast brewing cycle of which the disclosed mechanism is capable, and the lightweight, tough, hard-surfaced but yieldable skirt 64, in combination with the especially-shaped resilient filler 66, make it possible to produce a commercially reliable and feasible instant-brew apparatus of the class described.

The material found most effective in combination with a resilient filler member, such as the rubber annulus 66, is tetrafluoroethylene, which is available commercially from E. I. du Pont de Nemours & Co., Inc., of Wilmington, Delaware, under the trademark and name "Teflon," and while other fabric-like materials may provide one or more of the necessary characteristics for use as substitutes, the named substance is the best known for use in such a combination at this time.

Opposite the lower end of the piston rod in the lower chassis chamber beneath the apron 20 is a crosswise stop bracket 70 (FIGS. 1 or 7) supported between the side walls of the body casting having secured thereto a shock-absorbing means 71 in the form of a small nylon block which lies beneath the free lower end of the piston rod 61 to be struck by the latter at the bottom of the piston stroke, as in FIG. 4. This arrangement provides a buffered stopping means which will suddenly arrest the descending piston repeatedly without damage, but with sufficiently violet jarring to dislodge substantially all spent coffee grounds from the head of the piston, as will more fully appear.

Beneath the apron 20 is a long piston rocker lever 74 mounted on a cross pin 75 seated in the opposite chassis side walls, one end of this pin projecting through to the outside of the wall and having adjustably set thereon (by means of a set screw in its mounting hub, as in FIG. 2) a short spring lever 76 connecting with one end of a strong traction spring 77, the opposite end of which engages an angle bracket 78 fixed onto said side wall. The spring tension is adjustable by loosening and resetting the lever 76 as required, and the driving effort of the spring is sufficient to return the piston down to the bottom of its stroke with great rapidity, the free end 74F of the rocker lever 74 being guided and stabilized by projection of said free end into the rear wall guide track 22 (FIG. 1).

Thus, oscillation of the rocker arm by action of the aforesaid spring 77 and certain special motor-driven cam means now to be described, will reciprocate the piston means 60 from the fully withdrawn lower starting position shown in FIG. 1 to a maximum elevated position at the top of its stroke (as indicated in dotted lines in FIG. 1) up close beneath the filter assembly on the cover assembly in the closed condition of the latter, the piston rod being coupled to the rocker arm 74 for this purpose by roller pin 57 which also traverses a slot in the free end region of the rocker at 74X (FIGS. 1 and 2).

Figure 5:
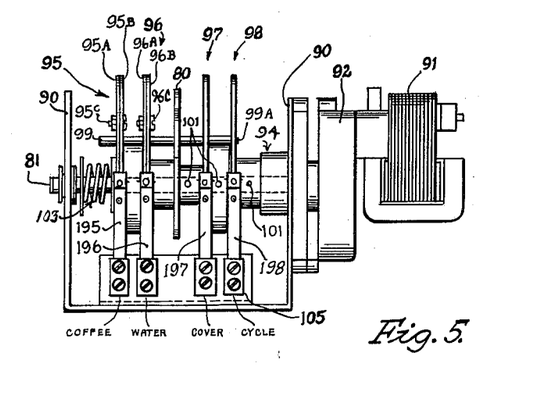
FIG. 5 is an elevational view of the brew driver-timer subassembly.

An important snap-action-return and scavenging function of the piston is achieved by provision of a special progressive-cycling drive means comprising the return spring 77 and a piston cam 80 (FIG. 1) carried on a timer shaft 81 as part of a compact timer-driver subassembly to be described more particularly hereafter in view of FIG. 5, and which is presently characterized by the fact that it is removably disposed as an operative sub-unit in the bottom cavity or chamber of the body casting beneath the apron 20 where it is completely shielded from the water and residues expelled from the brew chamber as aforesaid.

As viewed in FIG. 1, the cam 80 has a deep drop-off notch 82 into which a cooperative cam roller 79 on the rocker-lever 74 will fall quickly when the piston reaches the top of its stroke at the end of each brew cycle whereby to cause the piston to drop abruptly and rapidly under urging of spring 77 back to its starting position in readiness for each new cycle.

Figure 7:
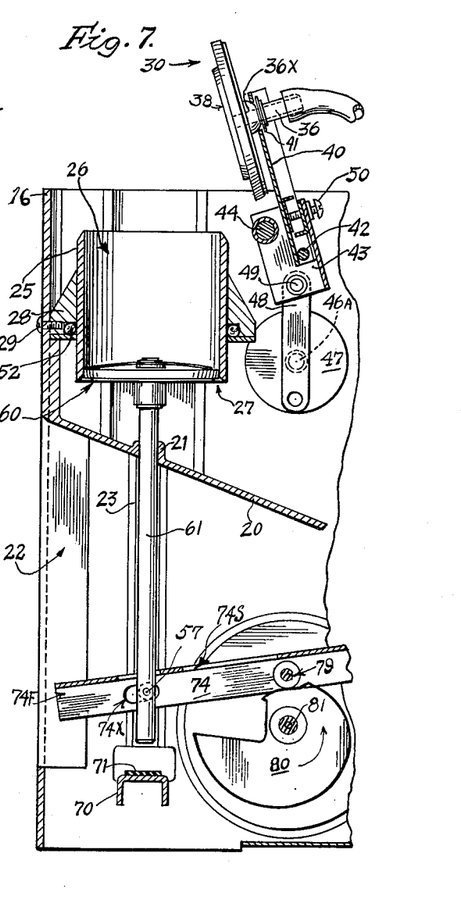
FIG. 7 is a partial vertical section through the brewing unit with the brew chamber in open-top loading condition.

Closely following the drop-off notch 82 on the drive cam is a shallow rise onto a dwell lobe 83 of short angular duration calculated to elevate the piston a very short distance, just entered into the cylinder, at which position it is arrested and held for the duration of a brief loading dwell amounting to a pause of one, and not more than two, seconds during which a measured charge of ground coffee and hot water can be fully discharged into the open top of the chamber by the time the piston resumes its upward travel to start the extracting or brewing phase of its cycle. The relative positions of the piston 60, lever 74, and cam 80 in this loading dwell is illustrated in FIG. 7.

When the piston drops suddenly home to starting position the peak of the drop-off formation 82 is in the position shown in FIG. 1 and is passed through a long slot 74S in the rocker lever 74 (FIG. 7) when the latter drops to its lower limit as a result of the drop off.

Figure 10:
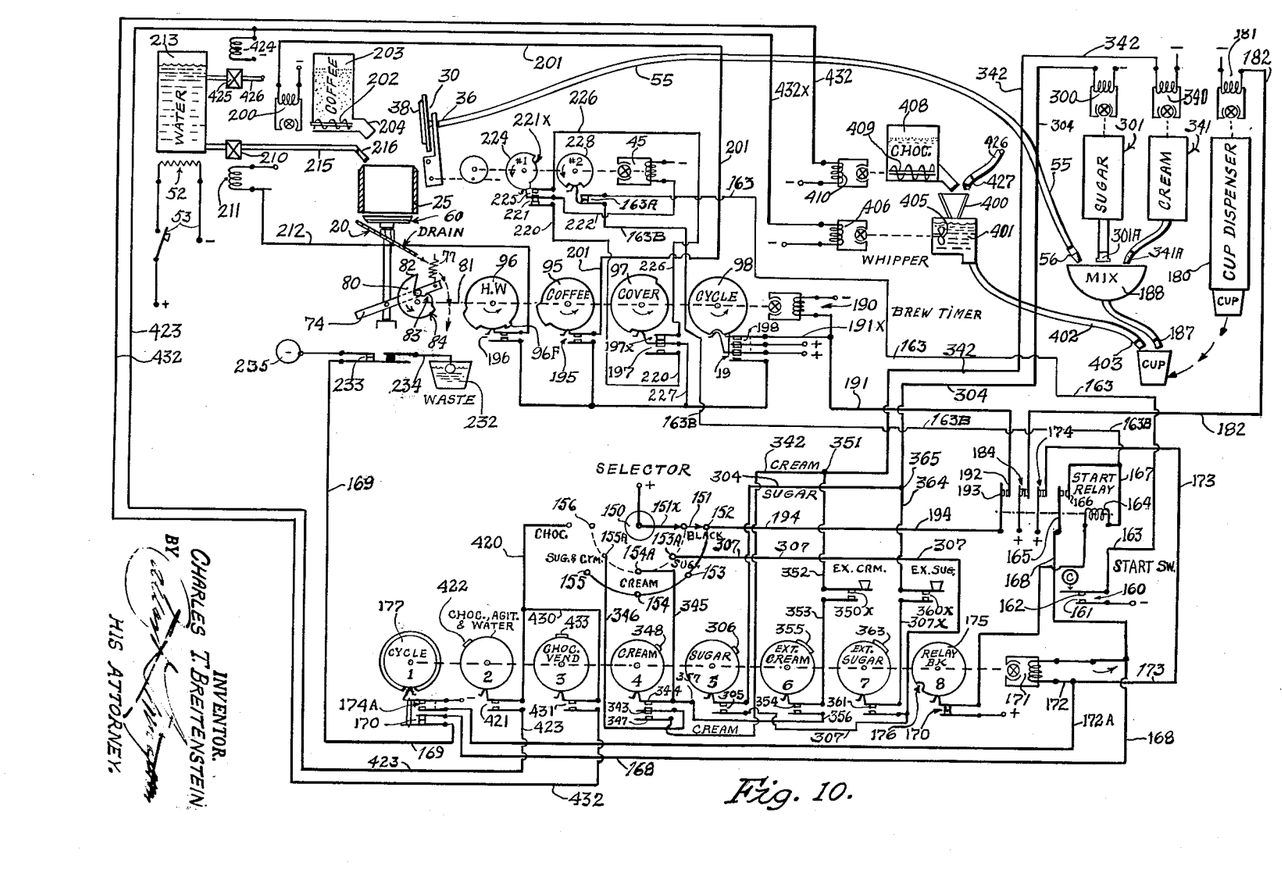
FIG. 10 is a schematic operating and circuit diagram.

The long remaining arc 84 of the cam periphery extending between the end of the loading dwell and back to the drop-off point completes the piston-advancing part of the cycle by elevating the piston to the top of its stroke close up beneath the filter head leaving only room for the grounds from which position the piston will be suddenly released and snapped back rapidly to the bottom of its stroke to a jarring stop by the buffer means 70, 71 to throw the spent grounds onto the apron 20, this action being followed, however, before termination of the cycle by certain final flushing operations to be described in the explanation and operation hereafter in view of the schematic of FIG. 10.

The aforesaid special timer-driver subassembly, as viewed in FIG. 5, comprises a U-shaped bracket 90 having secured to one of its sides a small fractional horsepower motor 91 with an attached reduction gear unit 92 from which extends a stub shaft (not seen) coupled by hub 94 to the aforesaid piston and cam drive shaft 81.

Carried on the drive shaft 81 is a composite cam assembly consisting of the centermost piston-driving cam 80 flanked by two switch cams 95, 96, on one side thereof, and two more switch cams 97, 98, on the opposite side thereof. The two outermost switch cams 95 and 96 are adjustable in that they each consist of two juxtaposed and relatively rotatable companion discs, such as 95A, 95B (FIG. 5), secured together in selectively set positions (see also the fragment of cam 96A shown in FIG. 1) by a clamping-screw means 95C in one disc working in a long arcuate slot 95D in the companion disc to clamp the pair together, the two cam edges of these pairs of discs being mutually developed to provide a changeable length and pattern of switch-actuating notch or lobe which may be varied by selectively turning of one of the two discs of either such pair relative to its companion disc, on loosening of said set screw 95C, until the desired cam pattern is obtained, and then resetting the screw; and for such purposes cams 95 and 96 float on shaft 81 except insofar as they are joined to the other cams by a tie rod 99, staked into the inner cam as at 99A. Any axial slack between cams floating on the spindle 81 is taken up by a compression spring 103 acting between the bracket arm 90 and the cam 95 in the embodiment of FIG. 5; or by the spring 103X and the cams 95 and 96 in the embodiment of FIG. 5A.

All of the cams have hubs engaging shaft 81, the two inner hubs being pinned as at 101 to the shaft 81, the pin on the cam nearest the reduction gear also engaging the gear stub shaft (not seen).

Timer switch means operated by the timing cams 95, 96, 97, and 98 includes a set of corresponding blade switches 195, 196, 197, and 198 (FIGS. 1, 5 and 10) seated on a bracket plate 105 fixed on the subassembly bracket 90 with each switch in operative alignment with an appertaining one of the set of cams. Suitable circuit connections are extended from the foregoing cam switches and drive motor to a master control circuit, to be described hereafter in view of FIG. 10.

The aforesaid drive-timer subassembly unit is simple, compact, and easy to remove for adjustment, servicing, or replacement from its shielded location beneath the chassis apron 20 where it is protected from the spent grounds and wash water scavenged from the brew chamber at the end of each brewing cycle. The essential brew-timing elements, such as the coffee, hot water closure and cycling cams 95–98 are carried on the same shaft 81 with the master piston timing and driving cam 80, by reason of which synchronism is positively maintained, while at the same time the entire timing subassembly is replaceable without disturbing the essential synchronization of these parts.

The timer subassembly described in view of FIG. 5 is adjustable with respect to its compound cams 95 and 96, which are respectively the coffee and hot water control cams, and once set, there will be ordinarily no occasion to change the setting unless the brand or mix of coffee is changed. This form of timer will generally be employed in restaurant and counter type units, such for example, as that disclosed in a copending application, Serial No. Des. 59,883, filed March 28, 1960, now Patent Des. 192,594, granted April 17, 1962.

Figure 5A:
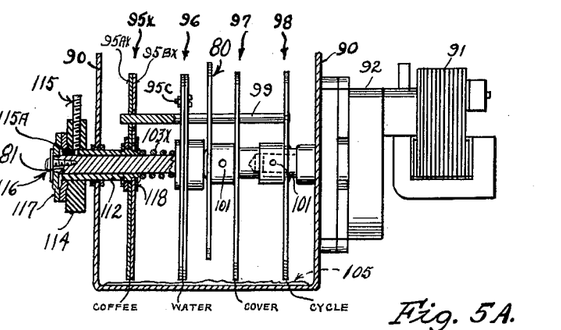
FIG. 5A is an elevational view of a modified form of the timer subassembly, parts being broken away.

However, some coin-operated machines may be required to vend a larger or smaller cup on certain locations or a stronger or weaker concentration of coffee and in such machines the timer subassembly is desirably modified according to FIG. 5A, wherein the adjustment is externally controlled, while the basic construction is otherwise substantially the same as that described in view of FIG. 5, with certain exceptions now to be described and which will be identified hereafter by like reference characters carrying an X suffix, while parts which are the same as those used in the FIG. 5 construction will carry reference characters identical to those employed in FIG. 5.

The compound coffee cam 95X with its two component cams 95AX and 95BX are carried on a sleeve 112 which floats on the drive shaft 81, but the take-up spring 103X is transposed to a position between the end of said sleeve and hot-water cam 96 to make room for said sleeve.

Figure 5B:
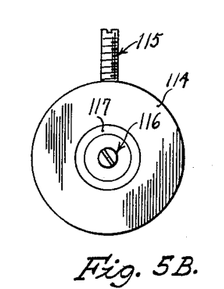
FIG. 5B is a front fragmentary detail to enlarged scale of the modified timer adjustment knob.

An adjustment knob 114 is fitted on the outer end of the sleeve projection beyond the wall of the U-shaped mounting or trunnion bracket 90, and this knob is provided with a long set screw 115 which may be screwed in to set its nose 115A against the drive shaft after the knob has been turned to a desired position, the extra length of this set screw serving as a pointer, as in FIG. 5B. A retaining washer and screw means 116 presses a large friction washer 117 against the knob to keep it in selected positions until the set screw is turned home.

The modified coffee cams 95AX and 95BX are of the same construction as their counterparts in FIG. 5, so far as their relation to the tie rod 99 is concerned, the outer cam 95AX having a hole 104 (FIG. 5C) into which the rod fits fairly snugly, while the companion cam 95BX has the long arcuate slot 95DX (FIG. 5C) so that it may shift across the rod for angular adjustment. Accordingly, cam 95BX is fixed on sleeve 112 by a peened-in washer 118, while the outer cam 95AX floats on the sleeve and will be held relatively stationary by rod 99 when the knob 114 is selectively rotated to turn the sleeve and hence the cam 95BX.

For purposes of clarity, the blade switches 195, 196, etc. have been cut away from FIG. 5A.

Figure 5C:
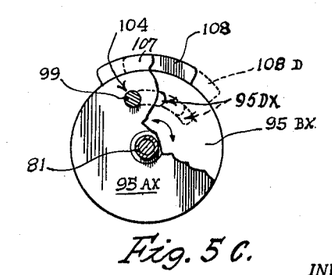
FIG. 5C is a sectionalized and fragmentary detail to reduced scale to illustate the adjustment of one of the compound timer cams.
Figure 6:
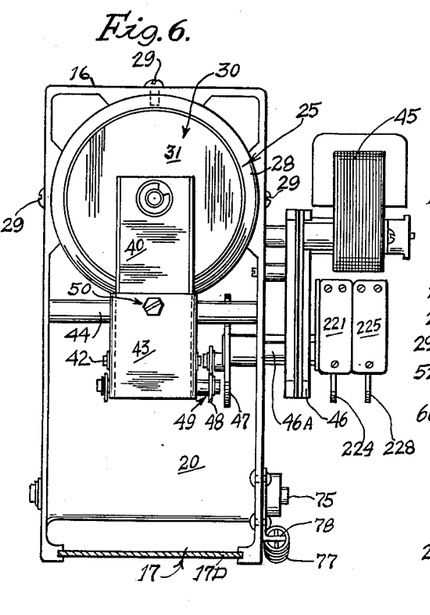
FIG. 6 is a top plan view of the brewing unit with parts shown in section.

In FIGURE 5C the cam 95AX has a lobe 107, while the companion cam 95BX has a similar lobe 108, and the long slot 95DX so that it can move relative to the rod and make the resultant cam lobe double length, as in dotted lines at 103D, or only the minimum length of the one lobe 107.

Operation and Circuitry

The coin-controlled embodiment of the apparatus illustrated in FIG. 10 dispenses hot chocolate as well as coffee, and includes a selector switch knob 150 for setting a selector contact 151 on contacts which will effect delivery of coffee black, or with cream or sugar, or both cream and sugar, or with double portions of cream or sugar or both, depending on the setting of the selector switch to the corresponding positions as indicated by the legends on the diagram of FIG. 10, all such selections being made in advance of operation of the start switch 160 by the patron.

Since chocolate dispensing does not involve the brewer unit, this selection will be alluded to only briefly at a later time, and the basic operation of the brewer will be described first in terms of a cycle for dispensing straight black coffee.

Assuming that the black coffee selector switch means 150—151 is set on "black" and that the start switch 160 is then actuated, as by a coin C passed by any conventional coin-testing device (not shown), the dispensing cycle will be initiated by closure of start switch contacts 161, 162, thereby applying power via conductor 163, normally-closed cover switch contacts 163A, and conductor 163B, to the start relay coil 164 which at once locks in its own holding circuit at contacts 165—166 to apply holding power from feed conductor 168 to relay hold jumper 167.

The holding contact 165 derives power via conductor 168, 169 and normally closed cycle breaker contacts 170 on a master or vend timer unit driven by a small geared-down motor 171 which is started at this time also by application of power thereto via conductors 172, 173 and start relay make contacts 174. The motor turns the set of eight timer cams, including the breaker cam 175, slowly through the dispensing cycle. However, the cam notch 176 opens contact 170 shortly after the motor starts and drops out the start relay, which by this time will have had ample time to pulse the various starting circuits controlled thereby. In the meanwhile, the running cycle of the timer motor 171 will be held up via branch conductor 172A and cycle-timer contacts 174A controlled by "Cyc." cam 177, closed by starting of motor 171.

A further result of operation of the start relay is the actuation of the cup dispenser 180 by energization of its own self-cycling motor 181, which needs only to be started by a pulse via conductor 182 through make contacts 184 on the relay. This cup dispenser may be any of a variety of known motor-driven types commonly available on the market, these devices being self-cycling, once started, to release one paper cup from a magazine, the cups being guided into position by known structures (e.g., that shown in U.S. Patents No. 2,994,420) beneath a dispensing spigot or nozzle 187 leading from a mixing basin 188 into which the coffee will be discharged when the brew cycle is completed.

Still another result of operation of the start relay will be the energization of the brew timer motor 190 via conductor 191 and make contacts 192, 193 on the start relay, contact 193 deriving power via conductor 194 and contact button 152 at the "Black" position on the selector switch, which contact in turn derives power in this setting from selector wiper contact 151 and its indicated connection to the power source.

As soon as the brewer motor 190 receives its starting impulse it rotates its own timing or index cam 98 far enough to close contacts 198, which shunt running current to the motor via conductor 191X so that the brewer motor continues to run through its cycle after the start relay is dropped out.

As a further result of initial movement of the brewer motor and shaft 81, the driving cam 80 is rotated and acts upon lever 74 to elevate the piston which upon just entering the cylinder 25 is arrested owing to the loading dwell 83 thereon, which holds the piston briefly in loading position. At this time a charge of ground coffee and hot water will be released into the brew cylinder by action of the coffee cam 95 closing contacts 195 to start the self-cycling coffee dispenser motor 200 via conductor 201, which will then by its own control circuit drive a dispensing screw 202 for a predetermined time to expel a measured charge of ground coffee from the bulk supply in the canister 203 via a spout 204 positioned above the now open top of the brew cylinder. Such coffee dispensing devices are well-known and a choice of the class described is available on the market.

Shortly following the release of the measure of coffee, a hot water valve 210 is opened by energization of its coil 211 via conductor 212 as a result of closure of contacts 196 by timer cam 96, thus directing a measured volume of hot water from the tank 213 via conduit 215 from discharge from nozzle 216 directed into the now open top of the brew chamber.

The aforesaid brewer-charging or loading operation is allowed one to two seconds of the total preferred cycle of 11 seconds, depending mainly on the volumetric size of cup to be vended. The hot water valve 210 is used only for coffee, there being a second valve, referred to later, for preparing hot chocolate. The supply of water is heated by a continuously energized, self-regulating heater means 53.

At the conclusion of the aforesaid loading operation the cover assembly 30 will close owing to energization of the cover motor 45 by closure of cover-cam contacts 197, which apply power via conductor 220 through the now closed contacts 221 of a cover supervisory switch and conductor 222 to cover motor 45. When the cover is fully seated upon the cylinder the notch 221X in a cam 224 driven by the cover motor 45 (FIG. 3) will open switch 221 and stop said motor, leaving the cover firmly closed.

Substantially at the instant the cover is seated home, the piston resumes its upward travel and continues to the top of its stroke owing to advance of the long driving lobe 84 on the cam, whereby the extraction progresses with the advance of the piston with the brew being pressed through the filter 38 into the flexible delivery line 55 connecting with a nozzle 56 directed into the mixing bowl 188 from which the coffee will gravitate into the designated cup previously delivered therebelow.

Had the patron selected cream or sugar, these ingredients would have been introduced into the mixing bowl for admixture concurrently with the entering coffee. These variant operations will be described hereafter.

The volume of brew prepared in each cycle is calculated to deliver a full, uniform measure into the customer's cup, with a residual reflux volume left in the line 55 sufficient for use to cleanse the filter, as will now appear.

By the time the customer's volume has been discharged from the delivery line 55 the drop-off notch 82 in the driving cam will have been reached and the piston will suddenly be freed of the cam and be rapidly retracted by action of return spring 77, creating a very substantial suction within the cylinder with the result that the reflux volume of liquid preserved in line 55 will be very energetically sucked back through the nipple 36 into the cover assembly and thence through the filter 38, thereby effecting a most thorough cleansing of the latter of any coffee grounds clinging thereto, and this refluxed liquid will also to some degree aid in washing down the cylinder walls.

As the piston is nearing separation from the bottom of the cylinder the cover starts to open again by action of the cover cam 97 in reopening cover motor timer contacts 197 and once again closing companion contacts 197X to shunt the now open supervisory contacts 221 (which previously stopped this motor) by alternate contacts 225, which will now apply power from conductor 226 and jumper 227, to cover motor conductor 222, again starting the cover motor, which will be finally stopped at the end of the cycle when the cover is fully open again by the supervisory cover switch cam 224 (FIG. 3) driven by the cover motor and acting to open said alternate contacts 225.

As the cover approaches open position a jet of hot flushing water is released from the tank 213 and spout 216 by transistory action of a short flushing lobe 96F on the hot water cam momentarily closing the contacts 196 for pulsing the solenoid water valve coil 211, the piston at this time being substantially separated from the cylinder so that the bottom of the brew chamber is now open and the various flushing residues and liquids after washing down the cylinder walls will pass down the apron 20 to lodge in a suitable waste receiver 232 as indicated.

In unattended automatic installations the machines are arranged to be disabled whenever the level in the waste receiver 232 reaches danger of overflow, this being effected by opening of overflow switch 233 by rising action of a float lever 234, thereby disconnecting master power from terminal 235 to feed conductor 169 which feeds the vend timer motor and start relay holding contacts through the cycling contacts 170 on the master vend timer unit cycle cam 177 (#1). Thus, if the level in the waste receptacle is too high the cut-out switch 233 opens and disconnects power for starting the master timer motor and actuating the start relay, so that the machine cannot be started again until the waste receptacle is emptied.

In the case where the patron moves the selector switch contact 151 onto contact 153 for black coffee with sugar, the sugar dispensing motor 300 will be energized via conductor 304, vend timer contacts 305 (actuated by the sugar cam 306 to the sugar selector contact), conductors 307, and contact 153A, which is aligned with coffee contact 153 on the selector bank, so that both selector wipers 151, 151X complete starting power circuits for the brewer and sugar dispenser, since all of the brewer selector contacts 152, 153, 154, 155, are looped together as shown with conductor 194 to the brewer motor contact 193 on the start relay, and the tandem sugar contact 153A connects to the sugar dispenser motor via the timer circuit 307–304 just described, so that when the start switch is subsequently operated, the brewer will go through the same cycle previously described for straight "black" coffee with the added concurrent operation of the sugar dispensing motor 300 at a time beginning approximately with the issuance of the fresh brew from coffee delivery spigot 56 in order that the coffee may swirl into the mixing bowl and mix the sugar well therewith in the process.

If the patron desires only cream, the selector contacts 151, 151X will be lodged respectively on stationary contacts 154, 154A to energize the cream dispenser motor 340 via conductor 342 pulsed by cam 348 and its contacts 347, 343, 344, conductor 346, to selector contact 154A with the brewer cycling as before, since the companion stationary selector contact 154 is looped with start relay conductor 194 as aforesaid.

If both cream and sugar are desired, selector wipers 151 and 151X will be lodged on the stationary contacts 155 and 155A, respectively, and the brew cycle will be initiated as before via contact 155 looped with the start relay conductor 194, and both the sugar and the cream dispensing motors 300 and 340 will be energized via selector contact 155A, conductor 346, and a third contact 347 actuated by the cam 348, as last described.

The sugar and cream dispensing units 301, 341, are known devices available commercially, having respective self-contained driving motor 300, 340, with built-in cycling controls requiring only that their respective motors be given a starting pulse to pick up and complete their respective one-portion dispensing operations, such pulses being provided by the selector switch means and vend timer cam switches as just described. These dispensing device have respective discharge spouts 301A, 341A directed into the mixing bowl 188, and are timed as mentioned in conjunction with the sugar dispensing operation to discharge their measured quantities of sugar and cream into the bowl starting with the delivery of coffee thereto in order to procure a good swirling admixture therewith.

Should extra servings of sugar or cream be desired, it is merely necessary for the patron, after setting the selector switch for sugar, cream, or both, to depress either or both of the corresponding "extra" switches 350X or 360X to shunt the sugar- and/or cream-motor vend cam switches by a tandem cam switch having a longer switch-closing dwell.

If the extra sugar switch 360X is held closed, the power conductor 307 from selector switch contact 153A is connected via shunt conductor 307X, "extra" vend cam contacts 361, "extra" sugar switch contacts 360X, conductor 364 looped to sugar motor starting conductor 304 at junction 365. The vend timer cam 363 which actuates the "extra" sugar cam switch 361 has a dwell twice as long as the regular-portion cam 306, so that a double portion of sugar will thus be served.

In the case of a double serving of cream the "extra" cream switch contacts 350X will be held closed, thus connecting the cream dispensing motor starting conductor 342 at junction 351 via conductor 352 through said "extra" contacts 350X and conductor 353 to the vend timer cam contacts 354, which will be closed by their cam 355, likewise having an operating lobe twice as long as the regular cream portion cam 348, so that the regular cream cam switch contacts 343, 344 will be shunted via the shunt conductor 356 joining conductor 345 from contact 344 at junction 357.

The commercial system illustrated schematically in FIG. 10 also includes a selection for hot chocolate at stationary selector switch contact 156. On this setting, operation of the start switch, as for the several coffee cycles, will cause a concurrent delivery of powdered chocolate and hot water into a separate mixing bowl 400, discharging in turn into an agitator chamber 401 from which leads a delivery tube 402 terminating in a nozzle 403 situated above the position of the cup-delivery station.

In the agitating unit 401 is a rotary impeller 405 driven rapidly by its own small motor 406. A chocolate powder hopper 408 is provided with a feed screw 409 discharging measured quantities of the chocolate powder into the mixing bowl 400 in response to the driving effort of the "chocolate" motor 410. The chocolate powder dispenser, mixing bowl, and agitator are usually assembled as a unit, and are commercially-known products, their operation being initiated by a suitable starting pulse for the two motors 406, 410, which are thereafter self-cycling by use of well-known circuit means, as in the case of the sugar and cream, and similar dispensing devices previously described.

The operation of the chocolate dispenser and agitator is such that when their cycle is initiated and hot water is delivered concurrently into the chocolate mixing bowl 400, a mixture of chocolate powder preparation and hot water will gravitate into the agitating chamber where the impeller 405 will whip the mixture into a suitable creamy consistency, enhanced by the presence in the chocolate powder of a powdered cream ingredient producing the effects of the usual whipped-cream, such chocolate preparations being available on the market for use in dispensers of the type described.

The patron having set the selector switch to lodge wiper contact 151 on the "hot chocolate" stationary contact 156, and having actuated the start switch to close contacts 161—162, the start relay will be energized as in the various coffee dispensing cycles, but the selector contact 156, being the only one not looped with the other contacts 155—154, 153 and 152 to the start relay, cannot cause a cycling of the brewer motor, but will cause energization and cycling of the vend timer motor 171 through closure of start relay contacts 174 and holding action of the motor cycling or index cam switch contacts 174A, as previously described for the starting of the coffee dispensing cycles.

Thus the entire set of vend timer cams (#1–8) will be cycled as usual, but without any effect so far as the coffee, sugar, cream, or "extra" control circuits are concerned, since the selector switch means does not complete any power feed connections for any of these other circuits in the hot chocolate setting.

However, the #2 vend timer cam will function, by connecting power from selector contact 156 via conductor 420, cam switch contacts 421 closed by cam 422 (#2) and conductor 423, to energize the solenoid valve coil 424 and open the second hot water valve 425 for delivery of the necessary measure of water via duct 426 to a position for discharge from nozzle 427 above the chocolate mixing bowl 400, at a time concurrent with the operation of the chocolate powder dispensing unit, as follows.

The power connected from the chocolate selector switch contact 156 to conductor 420, as aforesaid, is also applied via a branch conductor 430 through vend cam switch contacts 431, closed by the (#3) "chocolate" cam 433, to energize both the chocolate dispenser motor 410, via conductor 432, and the agitator motor 406 via branch conductor 432X, the latter two motors being self-cycling once started, as previously mentioned, and the cycle of the vend timer motor for this operation being controlled as usual by the #1 cycling cam in breaking the timer motor running circuit at contacts 174A, as in the case of the coffee cycles.

The open front 17 of the brewing unit will normally be closed by a metal drop panel 17D (FIGS. 1 and 2) slideably seating in grooves 14, and behind which the lower portion of the apron 20 terminates, as at 20X, in spaced relation to the drop panel so that the effluents will pass downwardly toward the waste receptacle and be prevented from spurting out into space in the direction of pitch of the apron, as would be the case in the absence of such a drop panel.

An interesting and useful attribute of the timer subassemblies of FIGS. 5 and 5A is the fact that either type may be mounted outboard of the chassis casting in the manner of the cover driving and supervisory unit 45—46; 224, 228 by simple transposition of the same to such a position and substituting for the shaft 81 another which is long enough to support only the driving cam 80 in operative position beneath the piston drive roller 79. Such an arrangement will generally be used, however, only in the attended or non-coin operated counter types of apparatus which have roomy cabinets not requiring the extremely compacted assembly of FIGS. 3 and 4, for example.

The described structural and functional novelties make possible a beverage dispenser capable of delivering individual servings of uniform quality, freshly brewed coffee in rapid succession requiring a total elapsed time of about 11 seconds per cup or cycle, as a preferred rate for commercial reliability in unattended dispensers.

Such performance is rendered possible by the particular phasing and timing of the progressive movements of the extracting piston and the almost instantaneous return travel and withdrawal thereof, with the attendant functions of scavenging the cylinder walls and the filter means as a result of the high suction created by the accelerated return of the piston and the vigorous flushing action of the reflux volume of brew, as well as the terminal hot water washing effected at the end of each cycle.

The use of screens as filters and attempts to wash the same clean by gravity movement of water or residual brew are known and considered unsatisfactory and such methods are wholly unsatisfactory for cleansing a cloth or like fabric filter as distinguished from a mesh or screen. The cloth filter is the most effective and desirable for quality brewing purposes if it can be cleansed and protected from untimely wear. The high degree suction created by the rapidly-returned, lightweight Teflon piston acting on the reflux volume of brew produces a commercially excellent filter-flushing means unsurpassed by anything previously available in this class of apparatus. A slow-acting piston, for example, will not effect equal results, neither will gravitating flushing with water or other liquids.

The outstanding performance of the disclosed brewer is further made possible by the timer driver subassembly of FIGS. 5 and 5A, not only in respect to the physical compactness and sheltered mounting and the servicing accessibility thereof, but also by reason of the combination and tie-in of the basic brew timing cams 95, 96, 97, and 98 with the principal driving cam 80 on the same power shaft 81, by means of which these essential brew timing elements can be kept indefinitely; effective synchronism, while permitting adjustments in respect to the coffee and water ingredients charges, without disturbing such synchronism.

I claim:

1. In a beverage brewer, a brew cylinder open at top and bottom, a cover for said top and motor-driven mechanism for moving the cover into and out of top closing and opening positions; piston closure means including a piston mounted beneath said cylinder and motor-driven mechanism for driving the piston upwardly into said cylinder to close the bottom thereof and a certain distance therebeyond in an extracting operation, together with means cooperable with said last-mentioned motor driven mechanism for rapidly withdrawing said piston in reverse direction; impact stop means located in the path of a part of the piston means for arresting the withdrawn piston suddenly to dislodge therefrom spent brew residues; and circuit means connecting with the motor means of both said motor-driven mechanisms and operable to energize the same in a predetermined timed relation.

2. In a coffee brewer of the piston extraction type, a fast-cycling brewing apparatus comprising a brew cylinder open at opposite ends, a reciprocable piston and drive rod means therefor and means mounting the same for entering and closing one of said ends and travelling in an extracting stroke substantially to the opposite end; coacting motor, cam, and spring means operable to drive the piston in a cycle from a starting position out of the cylinder at a relatively slow speed through said extracting stroke with one full stoppage thereof for a short loading interval and very rapidly returning the piston from the end of said stroke to said starting position wholly withdrawn from the cylinder to open the same for discharge of brew residues.

3. Apparatus according to claim 2 further provided with a resilient bumper beneath said drive rod means to be struck by the latter at said starting position to dislodge spent brew ingredients therefrom; together with return spring means acting on said piston to accelerate return travel thereof and magnify the inertial dislodging effects on stoppage as aforesaid.

4. In a brewer of the piston-extraction type, a brew cylinder having opposite open ends, an extracting piston and means mounting the same for reciprocation into and fully out of the cylinder at one of said ends; a motor-driven cover means having an operating cycle of actuation for moving the same into and out of closing relation to the remaining cylinder end; a second motor means actuating said piston and including a unidirectionally-driven cam cooperable with the piston to drive the same from a withdrawn starting position out of the cylinder substantially fully into the cylinder; spring means normally acting to drive said piston to said withdrawn position; said cam having a drop-off formation serving to free the piston from operative connection therewith at a certain position advanced into the cylinder whereby said spring means is enabled suddenly to drive the piston reversely and rapidly back to said withdrawn position; and means at said withdrawn position for arresting said piston to bring the latter to a sudden jarring stop to dislodge spent brew residues therefrom, together with circuit means connected for operation to energize said motor means in a predetermined timed coordination in brewing cycles in which the piston starts from withdrawn position with said cover means open and stops inwardly of the appertaining end of the cylinder for a predetermined short interval to permit charging brew ingredients into the opposite open end, and thereafter resumes travel following closure of said cover means until freed by the drop-off formation aforesaid and returned to said withdrawn position.

5. In a fast-cycle brewer, an upright brew cylinder having opposite open ends top and bottom, reciprocable piston means enterable into the cylinder from a position withdrawn therefrom through an extraction stroke close to the top thereof and reversely back to a starting position withdrawn therefrom in brewing cycles; a cyclically-operable top closure means including a cover and cyclically-operable actuating mechanism operable in each cycle to open and close the same relative to said open top of the cylinder; means providing a brew-discharge line connecting with said cover for conducting the brew from said cylinder to a discharge station; filter means carried by said cover on the inner cylinder side thereof and interposed in the path of outgoing brew into said line; motor means operable to drive said cover actuating mechanism through operating cycles as aforesaid; motor means and drive mechanism actuated thereby cooperably with said piston means for moving the latter through brewing cycles as aforesaid; a control circuit including a start switch and timing switching means connected with said motor means to energize the latter for operation through their respective operating cycles in predetermined sequence relation at the start of which said cover stands open and said piston stands withdrawn as aforesaid, and the piston enters the cylinder a short distance to close the bottom and stop for a predetermined short period in which brew ingredients may be loaded through said open cylinder top; and thereafter said cover closes the top and said piston resumes travel through said extracting stroke back to withdrawn position, said cover thereupon opening at a time when the piston has travelled a substantial distance back toward the bottom of the cylinder; said cylinder and said line having a volumetric brew capacity calculated to discharge all but a small predetermined reflux volume of each brew through said line for each extracting stroke of the piston, by reason of which suction resulting from return travel of the piston will forcibly draw said reflux volume back into the cylinder through said filter for cleansing of the same.

6. In a brewer of the class described having an upright cylinder open at top and bottom with a top closure and actuating mechanism for opening and closing same in operating cycles, improvements comprising, namely: means providing a brew outlet in said closure; a bottom closure means in the form of a piston and means mounting the same for movement in operating cycles from a starting position wholly withdrawn from the cylinder to open the bottom thereof, through an extracting phase displaced far into the cylinder to drive the brew therefrom through said outlet, and thereafter through a return phase back to said starting position; and cyclically-operable power driving means for said closure-actuating mechanism and said piston for effecting an opening and closing cycle of operation of the closure and displacing the piston through all phases of said operating cycles thereof in a predetermined time sequence.

7. In a brewer, a brew cylinder, an extracting piston means movable in said cylinder, a chassis enclosure for said cylinder including a discharge apron integral therewith and positioned beneath the cylinder to receive brew residues and also forming, cooperable with the remainder of the chassis, a chamber beneath said cylinder; and drive means for said piston means disposed in said chamber.

8. The construction of claim 7 further characterized in that said drive means is a complete operative subassembly including at least a driving cam for the piston means, a shaft for said cam, means journalling said shaft, and a motor driving said shaft, and said subassembly is received in said chamber with said cam in driving relation with said piston means with the motor situated outside thereof.

9. In a piston type brewer, a cylinder open at both ends; a piston and driving rod therefor; a supporting structure mounting the cylinder in upright position and providing a bearing guide for said driving rod at a level below the lower open end of the cylinder for reciprocatory travel of the piston with clearance to move in brewing cycles into and out of the cylinder relative to said lower open end thereof; and means for reciprocating the piston including a piston-driving cam and shaft means mounting the cam to rotate in a region adjacent the lower end of the piston rod, and means drivingly transmitting cam motion to said piston rod for displacing the piston in brewing cycles of travel as aforesaid.

10. Apparatus according to claim 9 in which said supporting structure includes a chamber beneath the cylinder and piston and enclosing the lower end of the piston rod, and there is additionally provided a top closure for said cylinder, an actuating mechanism for opening and closing same; and means for controlling the loading of water and coffee into the open top of the cylinder, together with control cam means mounted on said shaft in fixed phase relation to said driving cam for controlling operation of said cover actuating mechanism and said coffee and water controlling means in a predetermined synchronous relation.

11. In a piston type brewer a cylinder having an open bottom and an open top; a closure for said top, said closure having a brew outlet; filter means disposed across the path of brew into said outlet; actuating mechanism for opening and closing said closure; an extracting piston for closing said bottom and expelling brew liquid through said filter means through said outlet; a brew delivery line connecting with said outlet and having a predetermined volume sufficient to contain a reflux filter-washing volume of residual brew, and drive means for said piston for entering the same into the cylinder to extract and expel a brew, and retract the piston vigorously to establish a substantial back pressure and pull said reflux volume back through the filter to wash the same.

12. A beverage-brewing cylinder having an open bottom and a bottom closure in the form of a compression piston adapted to work in the cylinder; means mounting the cylinder and piston in a cooperative relationship in which the piston is reciprocable in the cylinder and can be withdrawn fully therefrom to open said bottom thereof for discharge of spent brew material; means providing an openable and closable loading passage into the upper regions of the cylinder; cooperative closure and drive means for opening and closing said passage; a unidirectional drive mechanism for moving said piston from a starting position fully withdrawn from the cylinder to an advanced brew-compressing position and limit well within the cylinder; control means for actuating the said drive means and drive mechanism in a predetermined timed coordination in identical brewing cycles in each of which said piston is advanced from said starting position into the cylinder a short distance and arrested at a time when said passage is open for a momentary dwell at a loading position which is close to the bottom, the piston being thereafter further advanced to a predetermined stopping limit a substantial distance above said bottom at a time when said passage is closed to compress brew ingredient in the cylinder; means providing a brew discharge port in the upper regions of said cylinder adjacent said limit; and spring means acting on the piston in opposition to the action of said drive mechanism, and cooperatively controlled by the latter, for action to automatically return the piston rapidly from said advanced position back to starting position on the reaching of said limit by the piston.

13. In an automatic beverage brewer of the type having a brew cylinder with an open top and an open bottom and automatically controlled and cycled motor-driven closure means for said top and bottom, bottom closure means comprising, namely: piston means including a piston adapted to work in said cylinder and means mounting the same for movement into and out of the cylinder from an outside starting position beneath said bottom to an advanced limit near the top of the cylinder; drive mechanism including spring means having driving interconnection with said piston means and acting constantly to drive the piston in a direction outwardly of the cylinder to said starting position, and a unidirectionally-rotated cam also having driving interconnection with the piston means and having an angular drive range operative in each cycle of rotation from an index starting position to actuate the piston means and effect advance of the piston in opposition to the effort of said spring means and displace the piston from its said starting position to said limit of advance into the cylinder during a predetermined portion of the angular travel of the cam in each cycle, and thereafter during the remainder of said cycle to exert a minimal driving effort on the piston means such as will be sufficient to permit said spring means to drive the piston rapidly back to its starting position; and motor means for rotating said cam in operating cycles from and to the index position aforesaid.

14. Apparatus according to claim 13 further characterized in that said cam has a driving dwell located angularly within said drive range and effective to interrupt the aforesaid piston advance for a short dwell interval of predetermined duration of angular travel of the cam, whereby to stop the piston interiorly of the cylinder close to the bottom thereof and thereby leave a predetermined volumetric cylinder capacity thereabove to accommodate a predetermined volumetric charge of brew ingredients to be loaded into the cylinder through the open top thereof during said dwell interval.

15. In a high-speed one-cup coffee brewer, a brew cylinder open at opposite ends; a piston and means mounting the same in operative relation with the cylinder such that the piston can enter one of said ends from a starting position fully withdrawn therefrom and travel in a compression stroke therein a substantial distance toward the opposite end; a motor-driven closure means operable to open and close said opposite end; a piston motor and drive means operatively interconnecting the same with said piston for operation in cycles to move the piston from said starting position to a predetermined advanced limit of compression stroke and thereupon in each cycle to discontinue all advancing drive of the piston for the remainder of the cycle; and a further piston driving means operatively connecting with the piston to drive the same rapidly back to starting position from advanced position automatically on discontinuance of advancing piston drive as aforesaid.

16. In a piston type brewer, a brew cylinder open at opposite ends, a piston and means mounting the same to move into and out of one of said ends; a motor-actuated closure means for the opposite end; drive means for the piston comprising two prime movers both operatively connecting with the piston and operable for action respectively to move the piston in opposite directions, one of said prime movers being yieldable and the other of the same being drivingly interconnected with the piston through the medium of a rotatable cam device having cam formations providing a discontinuous driving action in part of its rotative cycle whereby to move the piston into the cylinder from a starting position outside thereof, and a driving discontinuity in the form of a drop-off during a remaining portion of its cycle during which said first prime mover drives the piston rapidly back to said starting position.

17. In a coffee bewer, a cylinder component and a piston component reciprocable therein in fluid-displacement action along an axis disposed at a substantial angle to the horizontal, said cylinder component defining a brew chamber having an opening at its lower end aligned with said axis and defining an exit for the piston component; means mounting said components in cooperative assembly and defining a terminal limit of retraction for the piston component from the brew chamber confronting said exit to leave the latter unobstructed so that liquid and solid content from the cylinder can be released therefrom under gravitational influence; means in the upper region of the cylinder component at a substantial inward displacement distance from said exit affording a loading inlet for brew material and a discharge outlet for liquid brew, said piston component being movable in a displacement excursion to a predetermined displacement limit inwardly of the cylinder component sufficient to displace a predetermined volume of brew liquid, loaded into the same at a time when the piston component is disposed inwardly of said exit a predetermined distance to close the same in a certain phase of movement of the piston component advancing from said terminal limit toward said displacement limit; motor-driven means operable to reciprocate said piston component in cycles of travel to and from said limits, and to cause the piston component to hesitate upon closing with said exit during the certain phase of movement aforesaid; means actuated in timed relation with the operation of said reciprocating means for loading a brew charge of coffee in relatively solid state and water in substantially said predetermined volume into the brew chamber via said loading inlet at a time during the aforesaid hesitation in movement of the piston component; means preventing the major portion of the coffee solids in each charge from escaping the chamber with the liquid phase thereof responsive to displacement advance of the piston component; and means acting in timed relation to movement of the piston following each displacement advance thereof to, and departure from said displacement limit, for causing entry into the chamber from the upper regions thereof of liquid acting to flush brew residue from the inner wall of the brew chamber and piston component during a time when the latter is in a phase of retreat from the displacement limit and approach to the terminal limit for opening said exit.

18. In a high-speed beverage brewer, means providing a substantially upright cylindrical brew chamber having a substantial opening at top and bottom end regions thereof; means providing a brew delivery exit from the upper regions of said chamber; openable closure means for each said opening, the top opening being adapted to admit to the chamber brew ingredients at least one of which is a liquid, the bottom closure being reciprocable coaxially of the cylinder chamber and having fluid-seal telescoping interfit with the inner walls thereof to move reciprocably in piston-displacement action therein between predetermined upper and lower limits, said upper limit being near the upper end region of the chamber and the lower limit being in opening juxtaposition with said bottom opening thereof to permit escape of brew residues therefrom; actuating mechanism operable to effect coordinated opening and closing action of both closures in a predetermined timed relationship in which the bottom opening of the cylinder is closed initially in advance of closing of the top opening at the commencement of each brewing operation to afford a bottom in the cylinder for loading of brew ingredients into the chamber through the top opening, the top closure thereafter being closed and the bottom closure advanced inwardly from the initially closing condition aforesaid to said upper limit to displace the fluid content of the brew through said delivery exit, the bottom closure being returned therefrom to said lower limit to permit exit of residual portions of the brew prepared in such brewing operation prior to disposition of the bottom closure in closing relation to the bottom opening preparatory to loading the chamber with a new charge of brew ingredients for an ensuing brewing operation.

19. In a beverage preparing machine, a brew unit adapted for fast cycling and including a piston component and a cylinder component one of which is movable relative to the other, the cylinder component having a brew cavity interfitting with the piston component for fluid-displacement action responsive to relative movement of one of said components with respect to the other; means mounting said components in cooperative relationship for displacement action as aforesaid with a particular end portion of said cavity located downwardly of remaining portions thereof, the cylinder component having a brew discharge outlet situated at the end of the cavity opposite said particular end portion and beyond a predetermined inner limit of position for the piston component therein, said cylinder component having a passage-opening communicating into the cavity at said particular end portion thereof and adapted to be closed off outward of the cavity by the piston component interfitted with said cavity said passage opening being of a size permitting passage of the piston component from the cavity, as well as egress for cavity content when unobstructed in consequence of lodgement of the piston component at a predetermined outer limit of position in which the same is separated a certain distance from the passage outwardly thereof; and actuating means for reciprocating that one of the components which is movable relative to the other and operable in brewing cycles to effect movement of said one of the components through a succession of positions of approach, lodgement, and departure relative to said limiting positions, whereby a predetermined liquid brew charge present in said cavity in that phase of a cycle in which said piston component is in a relation of approach to the inner limit of position inwardly of said passage opening, will be displaced through said discharge outlet, and content present in the cavity in that phase of each cycle wherein the piston component separates from the cavity for lodgement at the outer limit of position aforesaid will have downward egress from the cavity through said passage opening.

20. Apparatus according to claim 19 further characterized in that said actuating means is arranged and constructed to effect the movements of said movable one of the piston and cylinder components at different rates of speed during different phases of each operating cycle, such that movement during that phase in which the piston component is in relative departure from said inner limit of position and approach to said outer limit of position, is effected at a substantially increased rate of speed over the movement in reverse sense during the remainder of such cycle.

21. A brew unit according to claim 19 in which said piston component is further provided with a loading entrance to said cavity, together with closure means therefor, located at a level above said passage-opening, and said actuating means is arranged and constructed to effect movement of the movable one of said cylinder and piston components in each said cycle to dispose the same in at least a predetermined minimum condition of re-entry into said passage opening sufficient to close the latter and to cause said movable one of the components to dwell in such condition for a substantial but brief portion of each such cycle whereby to provide a loading interval of predetermined duration in which said closure means is actuated to open the loading entrance to passage of brew ingredients deposited therethrough, followed by closing of said closure means and termination of said dwell.

22. In a coffee brewer, in combination, a piston component and a cylinder component having a brew chamber adapted to receive charges of brew ingredient including infusible coffee and hot water, said components being mounted for relative interpositioning, one with respect to the other, to dispose the piston component in a progressive and regressive sequence of reciprocatory positions with respect to an advanced displacement terminus within the chamber adjacent one end thereof and a retraction terminus situated adjacent an exit passage leading from the chamber at an opposite end thereof and which opens generally outwardly and downwardly from the chamber, said exit being closed off when the piston component is disposed inwardly of the chamber therefrom, and being rendered open when the piston component is disposed outwardly of the chamber at said retraction terminus, said piston component having a loading position corresponding to disposition thereof inwardly of the chamber from said retraction terminus in close proximity and closing relationship to said exit, said chamber being provided with at least one additional passage constituting a brew discharge outlet leading therefrom in a displacement pressure zone thereof situated away from said advanced terminus toward said opposite end region thereof, and through which the major portion of the liquid phase of each brew charge is displaced in each brewing cycle; and actuating mechanism drivingly cooperative with at least one of the piston and cylinder components and operable in predetermined brewing cycles to cause relative displacement positioning thereof, one with respect to the other as aforesaid, to effect displacement of the liquid phase of the charge of brew ingredient through the coffee portion thereof and from the chamber via the discharge outlet by the aforesaid relative progressive change in position of the piston component with increasing proximity to said advanced terminus from said loading position in each cycle, and a regressive repositioning of said piston component at said retraction terminus to open said exit prior to commencement of the next succeeding cycle.

23. Brewing apparatus according to claim 22 wherein there is further provided means coacting in timed relation with said actuating mechanism in each operating cycle of the latter for loading said charges of brew ingredient into the chamber at a time when the piston component is disposed in said loading position.

24. The combination defined in claim 22 in which said actuating mechanism is arranged and constructed to impart at least two substantially differing speeds of movement for the respective progressive and regressive phases of change of position of the piston component, the speed in the progressive displacement phase being at a relatively slow predetermined rate for the purpose of effecting a predetermined liquid infusion of coffee, while the speed of movement in the regressive phase of the cycle is greatly increased to minimize the total time required for such cycle and to effect a quick opening of said exit and clearance of brew residues therefrom as a function of restoration of the piston component from a position of maximum advance displacement in infusion to said loading position prior to initiation of a succeeding cycle.

References Cited in the file of this patent

UNITED STATES PATENTS

| | | | |
|---|---|---|---|
| 862,540 | Christenson | | Aug. 6, 1907 |
| 894,091 | Williams | | July 21, 1908 |
| 2,721,511 | Hickey | | Oct. 25, 1955 |
| 2,827,845 | Richeson | | Mar. 25, 1958 |
| 2,898,844 | Gaggia | | Aug. 11, 1959 |
| 2,907,266 | Moulden | | Oct. 6, 1959 |

FOREIGN PATENTS

| | | |
|---|---|---|
| 1,211,939 | France | Oct. 12, 1959 |